United States Patent Office 3,318,971
Patented May 9, 1967

3,318,971
SOLVENT-SOLUBLE, HEAT-HARDENING, NON-GELLED RESIN COMPRISING ACRYLAMIDE-CONTAINING INTERPOLYMERS CARRYING A REACTIVE HYDROXY GROUP CONDENSED WITH HYDROXY-TERMINATED POLYSILOXANE
Le Roy A. Chloupek, Prospect Heights, and Kazys Sekmakas, Chicago, Ill., assignors to De Soto Chemical Coatings, Inc., Chicago, Ill., a corporation of Delaware
No Drawing. Filed May 10, 1963, Ser. No. 279,609
13 Claims. (Cl. 260—826)

The present invention relates to solvent-soluble, heat-hardening, non-gelled resins in which an interpolymer of interpolymerized components comprising an amide of an ethylenically unsaturated carboxylic acid and ethylenically unsaturated material copolymerizable therewith, said interpolymer being reacted with an aldehyde to provide reactive alkylol groups, is modified with hydroxy-terminated organo-silicone resinous material condensed onto side chains thereof to form new and valuable resinous materials. The new resins of the inventon are particularly useful in organic solvent solution coating compositions which cure at elevated temperature through what is believed to be an interaction between the amido alkylol group and residual silicone hydroxy groups.

Alkylolated acrylamide-containing interpolymers have previously been used in organic solvent solution coating compositions. Unfortunately, the prior interpolymers have been inadequate with regard to flexibility and adhesion to the coated substrate, especially adhesion to a metal substrate. Also, it has been desired to enhance the capacity of the interpolymer to resist prolonged exposure to the weather.

Organo-silicone resinous materials are also known, these being slow-curing and providing films which, though possessing superior durability, lack desirable physical characteristics, especially from the standpoint of film flexibility and toughness. Further, the cost of these silicone resinous materials is high, further limiting the utility thereof.

We have attempted to physically blend silicone resins including hydroxy-terminated silicone resins with commercially available acrylamide interpolymers, but without significant benefit. With small proportions of silicone resin, little was accomplished to justify the cost thereof. With large proportions of silicone resin, the rapid curing character of the acrylamide interpolymer is degraded and the films are brittle and of limited utility.

In the invention, hydroxy-terminated organo-silicone resinous material is condensed with interpolymerized components of the alkylolated acrylamide interpolymer to provide a unitary resin which is capable of rapid cure at elevated temperature to form films possessing outstanding adhesion to metal and superior flexibility as well as improved resistance to exterior exposure. Moreover, the presence of the silicone resinous material is beneficial within a very large range of proportions.

Additionally, the coating systems contemplated by the invention are heat-hardening systems achieving solvent resistance through cure and providing excellent film gloss, where desired. The new resins of the invention form clear organic solvent solutions which may be pigmented if desired.

In accordance with the invention, the hydroxy-terminated organo-silicone resinous material is condensed with a functional group in the interpolymer which is reactive with the hydroxy group. The functional group in question may be constituted in whole or in part by the amido alkylol group. However, acrylamide or other ethylenically unsaturated amide is a relatively expensive component and it is desirable to limit the proportion thereof in the interpolymer. Accordingly, it is preferred to include among the components which are interpolymerized a component which provides a functional group reactive with the silicone hydroxyl group other than the amido alkylol group. Thus, whether the functional group is provided by the unsaturated amide or by the ethylenically unsaturated component copolymerizable with said amide, the silicone resin is condensed onto a side chain of the interpolymer to provide a unitary resin having both amido alkylol groups and silicone hydroxyl groups for subsequent cure. The condensation of the silicone resinous material to incorporate the same into a unitary resin with the components of the acrylamide interpolymer may be accomplished in various ways, as indicated below:

(1) By condensation reaction of the hydroxy-terminated silicone resinous material with the functional group of an ethylenically unsaturated material followed by interpolymerization;

(2) By interpolymerization of the unsaturated materials followed by condensation with the hydroxy-terminated silicone resinous material; and (3) By reactions (1) and (2) above effected simultaneously.

In any event, and irrespective of which procedural technique is adopted, the hydroxy-terminated silicone resinous material is combined with the interpolymer by a condensation reaction into a unitary resinous material in which the silicone resin is chemically bonded to the interpolymer as a side chain thereof.

At least some of the amido hydrogen atoms in the acrylamide interpolymer are replaced by reaction with aldehyde and the hydroxy groups generated in this manner may be etherified in whole or in part, but preferably in minor amount or not at all. Any aliphatic alcohol, including polyhydric alcohols such as glycols, may be used for etherification.

As a result, the interpolymer includes amido hydrogen atoms replaced by the structure:

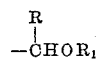

wherein R is selected from the group consisting of hydrogen, furyl, and aromatic and saturated lower aliphatic hydrocarbon radicals containing up to 10 carbon atoms, and $R_1$ is selected from the group consisting of hydrogen, and the etherification residue of aliphatic alcohol containing up to 10 carbon atoms. Preferably, R is hydrogen.

As will be more fully appreciated hereinafter, considerable variation is permissible in the kind and ratio of the aldehyde modifying agent and the etherifying agent, if used. Moreover, there is also a considerable variation which can be made in the specific nature of the interpolymerized unsaturated components of the acrylamide interpolymer, and the hydroxy-terminated silicone resinous material.

While it is preferred to employ acrylamide in proportions of from 2 to 50%, preferably from 2 to 30% by weight, based on the weight of the interpolymerized components, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

The acrylamide component is preferably interpolymerized with other ethylenically unsaturated material carrying a functional group which is reactive with or which has been reacted with the silicone hydroxyl group so that there will be in the linear interpolymer chain at least one component (other than the alkylolated acrylamide component) which is chemically condensed with the hydroxy-terminated silicone resin or which is capable of chemically condensing the hydroxy-terminated silicone resin to the interpolymer.

The invention particularly contemplates a condensation reaction between the functional group carried by the interpolymerizable component and the hydroxy group of the silicone component. The preferred functional group reactive with the silicone hydroxyl is the hydroxyl group, condensation apparently producing an ether type linkage.

Ethylenically unsaturated materials which carry an hydroxy functional group may be illustrated by monoethylenically unsaturated alcohols, including monohydric alcohols and polyhydric alcohols such as allyl alcohol, methallyl alcohol, crotyl alcohol, 2 butene-1, 4-diol, and the like. Ester reaction products of monoethylenically unsaturated carboxylic acid with a polyhydric alcohol may also be used, the preferred 2-hydroxy ethyl methacrylate falling within this category. Other preferred monomers within this category which may be used are illustrated by other hydroxy alkyl methacrylates and acrylates such as 2-hydroxy propyl methacrylate, 3-hydroxy propyl methacrylate, 4-hydroxy butyl methacrylate, 2-hydroxy ethyl acrylate, and glycerol monocrotonate, monoacrylate or monomethacrylate. Still further hydroxy-containing monomers which may be used are ethylene glycol allyl ether, propylene glycol allyl ether, butylene glycol allyl ether, diethylene glycol allyl ether, trimethylol propane monoallyl ether and glycerol monoallyl ether. Another monomer, illustrative of the diverse monomers which may be used is 2-hydroxy-methyl-5-norbornene (either the endo isomer or the exo isomer or mixtures thereof).

While the hydroxy group and an etherification-type of condensation reaction is preferred, the invention is not limited thereto since a similar condensation reaction takes place between the silicone hydroxy group and the carboxyl group of an ethylenically unsaturated carboxylic acid. Suitable ethylenically unsaturated carboxylic acids may be illustrated by monoethylenically unsaturated monocarboxylic acids such as acrylic acid, methacrylic acid, crotonic acid; monoethylenically unsaturated dicarboxylic acids and their corresponding anhydrides such as fumaric acid, maleic acid, maleic anhydride and monoesters thereof; and polyethylenically unsaturated carboxylic acids such as drying oil fatty acids including frosting oil fatty acids such as dehydrated castor oil fatty acids.

While monoethylenically unsaturated compounds are broadly preferred, the invention is not limited thereto and, indeed, certain polyethylenically unsaturated polyhydric materials are of outstanding utility, namely, polyethylenically unsaturated polyester resins having hydroxyl functionality. Indeed, an illustrative polyester resin is evaluated in a specific example included hereinafter.

The specific nature of the polyethylenically unsaturated polyester resins which may be incorporated in alkylolated amide interpolymers, aside from the preference for hydroxyl functionality expressed hereinbefore, forms no part of the present invention. Suitable polyester materials and appropriate procedures for the interpolymerization thereof are disclosed in the pending application of Kazys Sekmakas, Ser. No. 115,330, filed June 7, 1961, now U.S. Patent No. 3,163,615 granted December 29, 1964 and in the pending application of Kazys Sekmakas and Roland F. Stancl, Ser. No. 271,604, filed Apr. 9, 1963, the disclosures of which are hereby incorporated by reference.

The terms acid and alcohol are intended to include the corresponding anhydride such as dicarboxylic anhydride (maleic anhydride) or epoxy (glycidyl methacrylate). The term "condensation" is intended to include the corresponding addition reaction (where no water is split out) entered into by the corresponding anhydride as well as the reaction entered into by the corresponding halide with the elimination of hydrogen halide.

The acrylamide component and the ethylenically unsaturated component providing the functional group reactive with the silicone hydroxyl may constitute the entirety of the interpolymerized components of the interpolymer. Nevertheless, it is permissible, and in some instances desirable, to include significant proportions of other monomers, especially those containing the $CH_2=C<$ group, and which are not reactive with the hydroxy group of the silicone resin, especially combinations of monomers forming hard polymers, such as styrene, vinyl toluene and methyl methacrylate, with monomers forming soft polymers, such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate. Other diverse monomers such as vinyl chloride, vinyl stearate, n-butyl vinyl ether, lower olefins, acrylonitrile, etc., are also useful. Even materials devoid of the vinyl group such as maleic diesters, butene-2, conjugated fatty acids, etc., may also be employed. It is desirable to employ the other monomers which are non-reactive with the hydroxyl group in proportions of from 0–90% by weight based on the weight of the interpolymerized components, preferably from 20–90%, and most preferably from 50–90%.

Having discussed the interpolymerizable components, it is now appropriate to consider the variables which affect the hydroxy-terminated organo silicone resinous material which is condensed onto a side chain of the interpolymer, before, after, or simultaneous with interpolymer formation.

The preferred silicone materials are organo siloxanes produced from organo silanes containing at least two hydrolyzable substituents, which silanes have the general formula $R_ySiX_z$ in which X is a hydrolyzable radical selected from the group consisting of halogen and —OR' radicals, and in which R and R' are monovalent organic radicals selected from the group consisting of aliphatic, aromatic, alicyclic and heterocyclic radicals, "y" having the value 1 or 2 and "z" being 2 or 3. Such silanes are prepared by many well known reactions such as the Grignard reaction. Thus, the silanes are of two types: $RSiX_3$ or $R_2SiX_2$.

The organo-silanes of the type $RSiX_3$ produce on hydrolysis or acidolysis an organo silanetriol, for example,

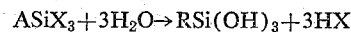

The hydrolysis is promoted by the use of mineral acids as catalysts and by heating up to 100° C. The organo silanetriol thus formed polymerize by condensation either spontaneously or by further heating up to 180° C., to form a polyorgano-siloxane having the structural unit:

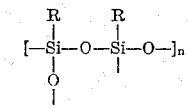

in which n denotes the average number of recurring groups in the resinous molecule.

In the preferred embodiment of the invention, an intermediate is formed by stopping the condensation reaction before completion as by cooling or neutralization. The resinous intermediate so formed has the following average structural formula in which R" indicates an organic group, which is desirably alkyl or aryl, but preferably phenyl:

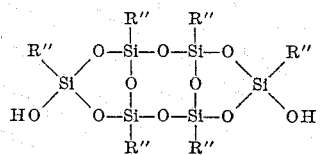

The specific hydroxy silicone resinous material having substantially the above structure in which R" is phenyl and which is hereinafter referred to as hydroxy silicone resin A has the following physical characteristics:

Average molecular weight _____ 1,600
Hydroxy content (percent) _____ 3.9
Combining weight (grams providing 1 gram mol of OH functionality) _____ 400

Of the organo-silanes of the second type, $R_2SiX_2$, one may employ those in which one of the R radicals is a hydrocarbon radical selected from the class consisting of branched-chain aliphatic, aliphatic and aromatic hydrocarbon radicals. Thes are characterized by being converted, on hydrolysis or acid-olysis, to the corresponding organo silane-diols, for example:

$$R_2SiX_2 + 2H_2O \rightarrow R_2Si(OH)_2 + 2HX$$

Likewise, the conversion is promoted by acid catalysts and by heating up to 100° C. The silane-diols thus formed condense with themselves spontaneously or by heating up to 180° C. to form the polyorgano-siloxane having the structural unit:

$$\begin{array}{c} R \\ | \\ -Si-O \\ | \\ R \end{array}$$

If the condensation is arrested at an intermediate stage, valuable liquid or solid condensates are produced.

The hydrolysis of the silane is readily effected in the case of the lower aliphatic members by merely mixing with an excess of water and in the case of the higher members by heating the mixture with an excess of water up to 100° C. Acid substances promote the hydrolysis and suitable agents are hydrochloric, sulfuric, phosphoric, ammonium bifluoride and the like. Alkalis such, for example, as ammonium, sodium, and potassium hydroxides also act as catalysts.

The silane-diols and silane-triols may also be produced from the silanes by acidolysis, for example, by heating the silane with an excess of the molecular equivalent of organic acid such, for example, as acetic, lactic, citric, or the like whereupon a reaction takes place according to the following equation:

$$R_ySi(OR) + zRCOOH \xrightarrow{H+} R_ySi(OH) + zRCOOR$$

This reaction can be carried out even in the absence of water by heating the mixture in a reflux in the presence of acid substances and then distilling off the volatile ester produced.

By way of illustrating but not by way of limiting the invention, there will be given the following examples of suitable silanes for use in the invention. Among the silanes of the type $RSiX_3$ there my be mentioned trimethoxy ethyl silane, triethoxy methyl silane, tributoxy amyl silane, trimethoxy allyl silane, triethoxy phenyl silane. Also, from 1 to 3 halogen atoms may be substituted for the alkoxy groups in the above-mentioned examples. Thus, one can use monomethyl trichloro silane, monoethyl dichloro monoethoxy silane, monoamyl monoethyl dichloro monoethoxy silane, monoamyl monochioro dibutoxy silane and the like. Of the silanes of the type $R_2SiX_2$, there may be used compounds in which "$X_2$" represents 1 halogen and 1 alkoxy or 2 halogen atoms or 2 alkoxy groups, and the $R_2$ may be diisopropyl, diisobutyl, disecondary butyl, dimethallyl, diallyl, ethyl tolyl, diphenyl tolyl, and phenyl xylyl; more specifically, isobutyl difluorosilane, isopropyl methyldibromsilane, amylallyldichlorosilane, methyl secondary butyl dimethoxysilane, phenyl amyltrichlorosilane, monomethallyloctodecyldichlorosilane, methallylphenyldiethoxysilane, and the like.

In accordance with the invention, the hydroxy silicone resin is used in a weight ratio to the interpolymer of from 2:98 to 75:25 more preferably from 4:96 to 50:50 and most preferably from 5:95 to 40:60.

It is preferred to employ in the interpolymer a stoichiometric excess of functional groups reactive with the hydroxyl group of the silicone resin over hydroxy groups in the silicone resin and, moreover, to effect only partial reaction between the two. Partial reaction is clearly evidenced by the absence of gel particles in the reaction product and also by the rapid cure which is achived and which is not characteristic of the hydroxy-silicone resin by itself. In preferred practice, the ratio of interpolymer functionality reactive with hydroxy to silicone hydroxy is in the range of from 1:0.03 to 1:2, preferably from 1:0.5 to 1:0.95.

In the preferred embodiment of the invention, the final resin obtained contains unreacted amido alkylol groups and unreacted silicone hydroxy groups providing a rapid cross-linking cure upon baking.

With respect to interpolymer production, it is possible, as disclosed in the prior application of Sakmakas et al., S.N. 100,804, filed Apr. 5, 1961, now U.S. Patent No. 3,163,623, granted Dec. 29, 1964, the disclosure of which is hereby incorporated by reference, to carry out the addition polymerization reaction at the same time that the aldehyde component is reacted with amido hydrogen atoms. In other words, polymerization and alkylolation may advantageously be accomplished at the same time and in a single stage. A basic catalyst may be used as taught in said prior application. Also, and in the absence of any significant proportion of vinyl monomer other than acrylamide, and especially when the acrylamide component is used in small amount, the single stage polymerization and alkylolation may be carried out without gelation in the absence of a basic catalyst.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, benzaldehyde and furfural, or substances yielding an aldehyde, such as paraformaldehyde, hexamethylene tetramine or trioxymethylene can also be used.

Etherification of the aldehyde-modified amide interpolymer is not essential. Lower alcohols and lower glycol ethers containing up to 10 carbon atoms, especially butanol and ethoxy and butoxy ethanol are preferred for etherification and the etherification reaction may be carried out up to 100% of the alkylol radical present in the interpolymer although little or no etherification is preferred. When less than 100% etherification is effected, as is preferred, the product is a mixture in which the amido hydrogen atoms in some of the acrylamide interpolymer molecules are replaced by the structure —ROH, and the amido hydrogen atoms in other of the acrylamide interpolymer molecules are replaced by the structure —$ROR_1$, R representing a hydrocarbon radical introduced by the aldehyde modifying agent and $R_1$ is the residue of the alcohol produced by the etherification reaction. When the etherifying alcohol is a glycol, the group $R_1$ is hydroxy-terminated, but this is permissible in the invention in which the presence or absence of etherification is a mere matter of choice.

While the interpolymers of the present invention are importantly useful alone in organic solvent solution coating compositions, they also exhibit excellent compatibility with other film-forming resinous materials, and are desirably applied in admixture therewith, the term "admixture" including partial pre-reaction between the respective components which are blended together. In this regard, excellent compatibility is exhibited with heat-hardening, solvent-soluble polymethylol compounds including urea-formaldehyde condensates and melamine-formaldehyde condensates as well as aldehyde condensates with other triazines, such as benzoguanamine, all of the foregoing falling generally within the heading of aminoplast resins. Good compatibility with other film-forming resins extends to alkyd resins, epoxy resins and vinyl resins. Also, the resinous materials may be employed alone, or in combination with one another.

Of especial note in connection with the present invention and as features thereof, excellent compatibility exists with hexamethylol melamine and hexamethoxymethyl melamine and hydroxy-containing addition copolymers illustrated particularly by copolymers of vinyl chloride and vinyl acetate, which have been partially hydrolyzed or saponified to convert a portion of the acetate groups to hydroxyl groups. The hydroxyl group provided in the addition copolymer referred to and in the hexamethylol melamine and hexamethoxymethyl melamine is highly reactive with the amido alkylol group of the acrylamide interpolymer and also with the hydroxyl groups on the silicone side chains to provide a rapid cure at elevated temperature producing insoluble coatings characterized by unusual flexibility coupled with significant hardness, properties which are normally antagonistic with respect to one another. Preferred copolymers contain from 80–92% by weight of vinyl chloride, with the balance of the copolymer being essentially vinyl acetate, and with a portion of the vinyl acetate converted to vinyl alcohol to provide a vinyl alcohol content of from 2–10% by weight, preferably from 3–8% by weight.

In the provision of blends in accordance with the invention, the proportions of the resinous materials which are blended may vary over the weight range of from 5:95 to 95:5. Preferably, the acrylamide interpolymer is used in proportions of from 20–90%, based on the weight of the mixture of resinous materials, and most preferably the acrylamide interpolymer is present in a major proportion of from 50–90%, based on the total weight of resinous material, especially when the acrylamide content of the interpolymer is in the range of from 2–20%, based on the weight of the interpolymerized components in the interpolymer.

The particular nature of the organic solvent used for the solution copolymerization or for the solvent solution application of the interpolymers is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with the other resinous materials listed hereinbefore, from a compatible organic solvent solution. These coating solutions may be pigmented or contain dyes, flow control agents, waxes and various other components as will be evident to those skilled in the art.

In the examples which follow, all parts are by weight, unless otherwise indicated.

EXAMPLE 1

A resinous condensation product of a hydroxy acrylamide interpolymer containing a hydroxy monomer with hydroxy silicone is prepared by a single stage reaction in accordance with the invention as follows:

*Resin composition*

95.2% interpolymer
    13% acrylamide
    42% styrene
    42% ethyl acrylate
    3% 2-hydroxy ethyl methacrylate
4.8% hydroxy silicone resin A

*Charge composition*

335 aromatic hydrocarbon solvent (boiling range of 145–195° C.)
175 n-butanol
100 paraformaldehyde
130 acrylamide
400 n-butanol
100 2-butoxy ethanol
3 triethyl amine
420 styrene
420 ethyl acrylate
30 hydroxy ethyl methacrylate
50 hydroxy silicone resin A
6 azobisbutyronitrile
20 di-tertiary dodecyl mercaptan
6 di-tertiary butyl peroxide
9 cumene-hydro-peroxide

*Procedure of preparation*

A mixture of 335 parts of the aromatic hydrocarbon solvent, 175 parts of n-butanol and 100 parts of paraformaldehyde is charged into a reactor equipped with an agitator, reflux condenser, thermometer, Dean-Stark trap filled with butanol and a nitrogen inlet tube and heated to 230° F.

A mixture of acrylamide dissolved in n-butanol and the remaining charge composition (with the exception of the cumene-hydro-peroxide) is added to the reactor from a separate container over a 2½ hour period while maintaining the temperature at 250° F., the water of condensation being distilled off and collected in the Dean-Stark trap.

The trap is removed after 12 cc. of water has been collected and the mixture is then refluxed for 8 hours at 250° F. Following the fourth, sixth and eighth hour, 3 grams of cumene-hydro-peroxide are added to the reaction mixture and the heating is continued until conversion.

The resin produced has the following physical characteristics:

Solids (percent) _____ 52.1
Viscosity (Gardner) _____ W
Color (Gardner) _____ 1–2

EXAMPLE 2

An unsaturated polyester resin-hydroxy silicone resin condensation product useful in the invention having the following composition:

Percent
Unsaturated polyester resin _____ 50
Hydroxy silicone resin _____ 50 is prepared by charging by weight, 250 parts of crotonic acid, 400 parts isophthalic acid, 790 parts of dehydrated caster oil fatty acids, 785 parts of glycerine, and 50 parts xylol as solvent into a reactor equipped with an agitator, heating mantel, Dean-Stark trap, thermometer, nitrogen inlet tube, and condenser. The mixture is heated to 420° F. and maintained at this temperature until an acid value of 5.0 is reached. The mixture is cooled to 380° F. and there are then added to the mixture 240 parts of a technical grade of 1,1'-isopropylidenebis(p-phenyleneoxy) di-2-propanol, 160 parts of phthalic anhydride and 255 parts of azelaic acid and the mixture is maintained at 420° F. until an acid value of 13–15 is reached. The mixture is then diluted to 80% solids with 510 parts of aromatic hydrocarbon solvent (boiling range of 145–195° C.). 2,500 parts of hydroxy silicone resin A are added to the reaction mixture and refluxed for 3 hours at 340° F. while collecting 72 cc. of water of reaction in the Dean-Stark trap.

The final physical characteristics of the polyester-silicone condensation product are:

| | |
|---|---|
| Solids (percent) | 88.5 |
| Viscosity (Gardner) | $Z_8+$ |
| Color (Gardner) | 4+ |
| Silicone (percent in final product) | 50 |

EXAMPLE 3

An acrylamide interpolymer utilizing the ethylenically unsaturated polyester resin-hydroxy silicone resin condensation product of Example 2 is prepared as follows:

*Monomer composition*

| | Percent |
|---|---|
| Acrylamide | 10 |
| Unsaturated polyester resin-silicone resin condesation product of Example 2 (50% silicone resin in condensation product) | 20 |
| Styrene | 25 |
| Ethyl acrylate | 30 |
| Methyl methacrylate | 5 |
| 2-ethyl hexyl acrylate | 10 |

*Charge Composition*

280 aromatic hydrocarbon solvent (boiling range of 145–195° C.)
100 n-butanol
80 paraformaldehyde
100 acrylamide
100 2-ethyl hexyl acrylate
205 n-butanol
215 2-butoxy ethanol
3 triethyl amine
250 styrene
50 methyl methacrylate
300 ethyl acrylate
230 polyester resin-silicone condensation product of Example 2 (88.5% non-volatile solids in butanol)
6 di-tertiary butyl peroxide
6 azobisbutyronitrile
2 benzoyl peroxide
18 tertiary dodecyl mercaptan
6 cumene-hydro-peroxide

*Procedure of preparation*

A mixture of 280 parts of the aromatic hydrocarbon solvent, 100 parts of n-butanol, and 80 parts of paraformaldehyde is charged into a reactor equipped with an agitator, reflux condenser, thermometer, and nitrogen inlet tube and heated to 230° F.

A mixture of acrylamide dissolved in 205 parts of n-butanol and 215 parts of 2-butoxy ethanol and the balance of the monomers and catalysts (with the exception of the cumene-hydro-peroxide) is added to the reactor from a separate container over a 2½ hour period while maintaining the temperature at 250° F. The mixture is refluxed for 6 hours, 3 parts of cumene-hydro-peroxide being added at the end of the fourth and the sixth hour to the reaction mixture and the heating is continued until the conversion point of 54–55% solids is reached.

The resin produced has the following physical characteristics:

| | |
|---|---|
| Solids (percent) | 55.1 |
| Viscosity (Gardner) | W–X |
| Color (Gardner) | 2 |
| Silicone (percent in final product) | 10 |

EXAMPLE 4

An unsaturated polyester resin useful in the invention is prepared by charging by weight, 790 parts of dehydrated caster oil fatty acids, 250 parts of crotonic acid, 785 parts of glycerine, 400 parts of isophthalic acid and 50 parts of xylol as reflux solvent into a reactor equipped with an agitator, heating mantel, Dean-Stark trap, thermometer, nitrogen gas inlet tube, and condenser. The mixture is heated to 420° F. and maintained at this temperature until an acid value of 5.0 is reached. The mixture is cooled to 380° F. and there are then added to the mixture 240 parts of a technical grade of 1,1'-isopropylidenebis(p-phenylenoxy) di-2-propanol, 160 parts of phthalic anhydride and 255 parts of azelaic acid, and the mixture is maintained at 420° F. until an acid value of 13–15 is reached. The product is diluted to 80% solids with 510 parts of n-butanol.

The final characteristics of the polyester are:

| | |
|---|---|
| Solids (percent) | 79.5 |
| Viscosity (Gardner) | V–W |
| Color (Gardner) | 3–4 |
| Acid value (non-volatile) | 13–15 |

EXAMPLE 5

A resinous interpolymer of acrylamide, the polyester of Example 4 and a hydroxy silicone resin is prepared in a single stage reaction in which the hydroxy silicone resin is condensed with a pre-reacted acrylamide interpolymer containing the hydroxy-terminated polyester of Example 4, as follows:

*Monomer composition (percent of final product)*

| | Percent |
|---|---|
| Acrylamide | 8.3 |
| Hydroxy silicone resin | 16.7 |
| Ethyl acrylate | 25.0 |
| 2-ethyl hexyl acrylate | 8.3 |
| Styrene | 20.8 |
| Methyl methacrylate | 4.2 |
| Unsaturated polyester resin of Example 4 (100% solids) | 16.7 |

*Charge composition*

300 higher boiling aromatic hydrocarbon solvents (boiling range of 145–195° C.)
60 n-butanol
45 40% formaldehyde solution in n-butanol
100 acrylamide
100 2-ethyl hexyl acrylate
130 n-butanol
215 2-butoxy ethanol
3 triethyl amine
150 40% formaldehyde solution in n-butanol
250 styrene
50 methyl methacrylate
250 unsaturated polyester resin of Example 4 (80% solids solution in n-butanol)
300 ethyl acrylate
6 di-tertiary butyl peroxide
6 azobisbutyronitrile
2 benzoyl peroxide
12 tertiary dodecyl mercaptan
5 cumene-hydro-peroxide
200 hydroxy silicone resin A

*Procedure of preparation*

A mixture of 300 parts of the aromatic hydrocarbon solvents, 60 parts of n-butanol and 45 parts of a 40% formaldehyde solution in n-butanol is charged into a reactor equipped with an agitator, reflux condenser, Dean-Stark trap, thermometer, and nitrogen inlet tube and heated to 250° F.

A mixture of 100 parts of acrylamide dissolved in 130 parts of n-butanol and 215 parts of 2-butoxy ethanol and the balance of the monomers and catalysts (with the exception of the silicone resin and the cumene-hydro-peroxide) is added to the reactor from a separate container over a 2½ hour period while maintaining the temperature at 250° F., the water of reaction (19 cc.) being collected in the Dean-Stark trap. The mixture is then refluxed for six hours, 3 parts of cumene-hydro-peroxide being added at the end of the fourth hour and 2 parts of cumene-hydro-peroxide being added at the end of the sixth hour, and the heating is continued until the conversion point of 53–54% solids is reached.

The interpolymer so formed is then reacted with 200 parts of hydroxy silicone resin A. The Dean-Stark trap is set and 25 cc. of water of condensation is collected. The reaction time is three hours at 240° F. The viscosity of the final product is adjusted to a viscosity of V–W (Gardner) with 150 parts of the mixture of higher boiling aromatic hydrocarbon solvents.

The final characteristics of the resin product are:

Solids (percent) _____ 56.2
Viscosity (Gardner) _____ V–W
Color _____ 2–3

The silicone-acrylamide interpolymer resin of Example 5 is evaluated in white high gloss aluminum coil coating formulations, containing 28% titanium dioxide and 32% of the resin of Example 5. The following results showing excellent gloss, adhesion and solvent resistance are obtained:

Gloss _____ 84.
Impact resistance (reverse) _____ Pass 45 inch/lbs.
Adhesion _____ Good.
60″ toluol resistance _____ Insoluble.
2T bend (a 180° bend having a diameter twice the thickness of the substrate) _____ Good.
Chill reverse impact (at 40° F.) _____ Pass 40 inch/lbs.
Pencil hardness _____ HB.

The silicone-acrylamide interpolymer resin of Example 5 is evaluated in metal decorative finishes. The enamel is applied onto 85 pound base weight cathodic dichromate tinplate 10–12 mg./square inch and baked for twelve minutes at 400° F. The silicone modified polymer exhibits improved flexibility as compared to polymer containing no silicone resin. Further, the silicone modified resin has much better adhesion to tinplate, scored and unscored, than does a polymer containing no silicone resin, as determined with an adhesive tape test. The wedge bend rating of the silicone-acrylamide interpolymer resin is 57 whereas the identical interpolymer containing no silicone resin exhibits a rating of 0.

As the above results illustrate, the coatings prepared utilizing the silicone modified resins of the invention have extremely good flexibility and impact properties are highly adherent to metal surfaces and possess excellent solvent resistance.

EXAMPLE 6

Example 5 is repeated replacing 25% of the resin solids used in this example with a corresponding weight of the following resin solutions:

(1) A benzoguanamine-formaldehyde resin which is a condensation product of 4 mols of formaldehyde with 1 mol of benzoguanamine in the presence of excess butanol and an acid catalyst to provide a heat-hardenable resin etherified with butanol to provide solvent solubility. The resin is utilized as a 60% resin solids solution of benzoguanamine-formaldehyde resin in a 50/50 weight ratio mixture of butanol/xylol.

(2) A butylated melamine-formaldehyde resin which is a condensation product of 5.5 mols of formaldehyde with 1 mol of melamine in the presence of excess butanol and formic acid catalyst to provide a solvent-soluble heat-hardening resin. The melamine-formaldehyde resin is used in the form of a 50% solids solution in 40/10 butanol/xylol solvent mixture which exhibits the following physical characteristics:

Viscosity _____ 320 centipoises.
Mineral spirits tolerance _____ 9.5/1 (95 cc./10 grams).
Acid number _____ Less than 1.0.

(3) A butylated urea-formaldehyde resin which is a condensation product of 2.2 mols of formaldehyde with 1 mol of urea in the presence of excess butanol and oxalic acid catalyst to provide a solvent-soluble heat-hardening resin. The urea-formaldehyde resin is used in the form of a 54% solids solution in 40/10 butanol/xylol solvent mixture which exhibits the following physical characteristics:

Viscosity _____ 460 centipoises.
Mineral spirits tolerance _____ 25 cc./10 grams resin.

(4) Hexamethoxymethyl melamine.
(5) A vinyl chloride-vinyl acetate copolymer containing 91% vinyl chloride, 3% vinyl acetate and 6% vinyl alcohol and having an intrinsic viscosity in 1% cyclohexanone at 20° C. of 0.57.

In each instance, an improved cure is noted by the achievement of insoluble films having increased hardness.

The invention is defined in the claims which follow.

We claim:
1. A solvent-soluble, heat-hardening, non-gelled resin comprising:
   (1) an interpolymer of interpolymerized components comprising:
      (A) an acrylamide in an amount of from 2–50% by weight based on the weight of the interpolymerized components; and
      (B) ethylenically unsaturated material copolymerizable with said amide and carrying a reactive hydroxyl group and
   (2) from 2 to 75% by weight based on the weight of the resin of hydrocarbon-substituted polysiloxane having a plurality of silicon-bonded OH groups, said polysiloxane being condensed with said interpolymerized components to form said resin by a reaction including the removal of water, and said interpolymer being reacted with from 0.2–5 equivalents of aldehyde per amide group in said interpolymer to generate amido alkylol groups therein.

2. A resin as recited in claim 1 in which formaldehyde is reacted with acrylamide.

3. A resin as recited in claim 1 in which said interpolymerized components include interpolymerized ethylically unsaturated material inert to the hydroxy group in an amount not exceeding 90% by weight, based on the total weight of interpolymerized components.

4. A solvent-soluble, heat-hardening non-gelled resin comprising:
   (1) interpolymerized components comprising:
      (A) an acrylamide in an amount of from 2–50% by weight based on the weight of the interpolymerized components;
      (B) from 20 to 90% by weight of ethylenically unsaturated material containing the

group as the sole functional group; and
      (C) an ethylenically unsaturated material copolymerizable with said components (A) and (B) and carrying an hydroxy group; said interpolymerized components being reacted with from 0.2–5 equivalents of aldehyde per amide group in said interpolymer; and
   (2) from 2–75% by weight based on the total weight of the resin of hydrocarbon-substituted polysiloxane having a plurality of silicon-bonded OH groups which is a resinous intermediate condensation product of a silane triol, said intermediate having the following structural unit formula:

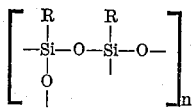

in which R is an organic radical selected from the group consisting of aliphatic, aromatic, alicyclic and heterocyclic radicals and $n$ indicates the number of reoccurring units, said polysiloxane being condensed onto a side chain of said interpolymer to form said resin by a reaction including the removal of water.

5. A resin as recited in claim 4 in which said R group of said polysiloxane is phenyl.

6. A resin as recited in claim 4 in which said ethylenically unsaturated material as recited in element 1-(C) is 2-hydroxy-ethyl methacrylate.

7. A resin as recited in claim 4 in which said ethylenically unsaturated material as recited in element 1-(C) is an hydroxy-terminated polyethylenically unsaturated polyester.

8. A solvent-soluble, heat-hardening non-gelled resin comprising:
(1) an interpolymer of interpolymerized components comprising:
(A) an acrylamide in an amount of from 2–50% by weight, based on the weight of the interpolymerized components;
(B) from 20 to 90% by weight of ethylenically unsaturated material containing the

group as the sole functional group; and
(C) an ethylenically unsaturated material co-polymerizable with said components (A) and (B) and carrying an hydroxy group; said interpolymer being reacted with formaldehyde generate amido methylol groups; and
(2) hydrocarbon-substituted polysiloxane having a pl rality of silicon-bonded OH groups condensed on a side chain of said interpolymer to form said resi the ratio of interpolymer functionality reactive wi the hydroxyl group to silicone hydroxy being in tl range of from 1:0.03 to 1:2 and said polysiloxa being partially condensed by a reaction including tl removal of water to provide in said resin unreacte amido methylol groups and unreacted silicone h droxy groups.

9. An organic solvent solution comprising an organ solvent having dissolved therein the resin of claim 4.

10. An organic solvent solution as recited in claim in which said organic solvent further contains from 5 1 95%, based on the total weight of resin, of hydrox functional solvent-soluble resinous material.

11. An organic solvent solution as recited in claim 1 in which said resinous material is heat-hardening amin( plast resin.

12. An organic solvent solution as recited in claim 1 in which said resinous material is a copolymer of fror 80–92% by weight of vinyl chloride, vinyl alcohol in a amount of from 2–10% by weight and the balance c the copolymer consisting essentially of vinyl acetate.

13. A resin as recited in claim 8 in which there is stoichiometric excess of hydroxy groups in said elemer 1-(C) over hydroxy groups in said polysiloxane.

References Cited by the Examiner
UNITED STATES PATENTS

| | | | |
|---|---|---|---|
| 3,118,852 | 1/1964 | Christenson et al. | 260—82 |
| 3,118,853 | 1/1964 | Hart et al. | 260—82 |
| 3,261,881 | 7/1966 | Christenson et al. | 260—82 |

SAMUEL H. BLECH, *Primary Examiner.*